(12) United States Patent
Iizuka (10) Patent No.: US 6,934,062 B2
(45) Date of Patent: Aug. 23, 2005

(54) SCANNING OPTICAL SYSTEM (75) Inventor: Takashi Iizuka, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 133 days.

(21) Appl. No.: 10/659,373

(22) Filed: Sep. 11, 2003

(65) Prior Publication Data
US 2004/0051924 A1 Mar. 18, 2004

(30) Foreign Application Priority Data
Sep. 13, 2002 (JP) ........................... 2002-268438

(51) Int. Cl.[7] .................................................. G02B 26/08
(52) U.S. Cl. ................. 359/204; 359/205; 359/212; 359/216; 359/217; 359/494; 359/495
(58) Field of Search ........................ 359/205, 212, 359/216–219, 249, 483, 494, 495, 497

(56) References Cited

U.S. PATENT DOCUMENTS 4,390,235 A 6/1983 Minoura ..................... 359/204
4,644,160 A 2/1987 Arimoto et al.
5,436,755 A * 7/1995 Guerin ....................... 359/249

FOREIGN PATENT DOCUMENTS

| JP | 57-54914 | 4/1982 |
| JP | 60126620 | 7/1985 |

* cited by examiner

Primary Examiner—Drew A. Dunn
Assistant Examiner—Craig Curtis
(74) Attorney, Agent, or Firm—Greenblum & Bernstein, P.L.C.

(57) ABSTRACT

A scanning optical system includes a light source that emits a plurality of beams, a deflector disposed on optical paths of the beams emitted from light source, which deflector deflects the beams toward an object surface so that beam spots formed by the beams scan on the object surface in a main scanning direction, and a birefringent double-image member disposed on the optical paths of the beams. The birefringent double-image member splits each of the beams passing therethrough into an ordinary ray and an extraordinary ray that is displaced from the ordinary ray in an auxiliary scanning direction and travels in a vicinity of the ordinary ray. Note that the auxiliary scanning direction is a direction perpendicular to the main scanning direction.

13 Claims, 6 Drawing Sheets

SCANNING OPTICAL SYSTEM

BACKGROUND OF THE INVENTION

The present invention relates to a scanning optical system, and in particular to a multi-beam scanning optical system that scans a plurality of beams across an object surface to form an image thereon.

In a multi-beam scanning optical system, multiple beams are deflected simultaneously by a single reflection surface of a deflector such as a polygon mirror. The deflected beams simultaneously scan across an object surface to form an image thereon. Thus, the multi-beam scanning optical system is capable of fast printing.

Various kinds of light sources are utilized in the multi-beam scanning optical system. Examples of such light sources includes a single element having a plurality of light emitting points such as that disclosed in Japanese Patent Application Provisional Publication SHOU 57-54914. Another example of the light source is a device disclosed in Japanese Patent Application Provisional Publication SHOU 60-126620, which is composed of a plurality of light emitting elements each having a single light emitting point.

In the multi-beam scanning optical system, the light source is provided such that the light emitting points thereof are arranged in an auxiliary scanning direction (which is perpendicular to a main scanning direction in which the beam spots are scanned on the object surface). The multiple light beams emitted from the light source are converged on the object surface by the scanning optical system and scanned thereacross to form a plurality of scanning lines. Since there is a finite spacing between each pair of adjacent light emitting points irrespective of the type of light source, there is also a finite spacing between each pair of adjacent scanning lines formed on the object surface. If a high quality, or high resolution, printing is desired, this spacing between adjacent scanning lines should be made small or the adjacent scanning lines should be even overlapped on each other.

Conventionally, various methods for eliminating the spacing between adjacent scanning lines to make them overlap one another are developed.

In one exemplary method, an aperture is located at a pupil position of a line image forming lens which converges each beam emitted from the light source into a line image in a vicinity of a polygon mirror. The aperture size is reduced while keeping the light emitting points arranged in the auxiliary scanning direction. As a result, the sizes of the beam spots formed on the object surface increase and the scanning lines formed by these enlarged beam spots become to overlap one another.

In this method, however, a large part of the energy of each beam is cut off by the aperture. Thus, the energy efficiency of the scanning optical system is very low.

In another exemplary method, the light emitting points of the light source are arranged in a slanting direction against the main scanning direction to reduce the distance in the auxiliary scanning direction of the beam spots formed on the object surface.

If a multi-beam semiconductor laser is utilized as the laser source, the major diameter direction of the far field pattern of each laser beam inclines against the auxiliary scanning direction. This inclination of the major diameter direction reduces the overlap between the adjacent scanning lines. Thus, an anamorphic lens or a slit is disposed on the path of the laser beams to adjust the major diameter direction of each laser beam to the auxiliary scanning direction. The addition of the anamorphic lens or the slit is not desirable since the costly anamorphic lens increases the total cost of the scanning optical system, and the slit reduces the energy efficiency of the scanning optical system.

Therefore, there is a need for a multi-beam scanning optical system that forms a plurality of scanning lines on an object surface, in which adjacent scanning lines overlap one another, without utilizing costly anamorphic lenses and without significantly reducing the energy efficiency.

SUMMARY OF THE INVENTION

The present invention is advantageous in that a scanning optical system is provided that satisfies the above mentioned need.

A scanning optical system according to an aspect of the invention includes a light source that emits a plurality of beams, a deflector disposed on optical paths of the beams emitted from the light source, which deflector deflects the beams toward an object surface so that beam spots formed by the beams scan on the object surface in a main scanning direction, and a birefringent double-image member disposed on the optical paths of the beams. The birefringent double-image member splits each of the beams passing therethrough into an ordinary ray and an extraordinary ray that is displaced from the ordinary ray in an auxiliary scanning direction and travels in a vicinity of the ordinary ray. Note that the auxiliary scanning direction is a direction perpendicular to the main scanning direction.

Optionally, the birefringent double-image member may be configured such that each extraordinary ray travels in a direction slightly inclined against a direction in which the corresponding ordinary ray travels. One example of such a birefringent double-image member is a wedge like form birefringent double-image member.

Alternatively, the birefringent double-image member may be configured such that each extraordinary ray travels in parallel with the corresponding ordinary ray. One example of such a birefringent double-image member is a plate form birefringent double-image member having parallel surfaces.

In the above cases, the scanning optical system may further include a collimator disposed between the light source and the deflector for converting the beams emitted from the light source from divergent lights into collimated lights, a line image forming lens disposed between the collimator and the deflector so that the beams are converged in the auxiliary scanning direction to form a line image in a vicinity of the deflector, and an image forming optical system disposed between the deflector and the object surface so that the beams deflected by the deflector are converged in a vicinity of the object surface in both the main and auxiliary scanning direction. The birefringent double-image member may be disposed between the collimator and the line image forming lens, or, between the line image forming lens and the deflector.

In cases, the beams emitted from the light source are linearly polarized, which occurs when the light source is a semiconductor laser, for example, a quarter-wave plate may be disposed between the light source and the birefringent double-image member. Alternatively, a half-wave plate may be disposed between the light source and the birefringent double-image member, which half-wave plate adjusts a polarized direction of each of the linearly polarized beams so as to make an angle of 45° with an optic axis of the birefringent double-image member.

In the above cases, a second quarter-wave plate may be further disposed between the birefringent double-image member and the deflector.

DETAILED DESCRIPTION OF THE EMBODIMENTS

Hereinafter, embodiments of the present invention will be described with reference to the accompanying drawings.

First Embodiment

Figure 1:
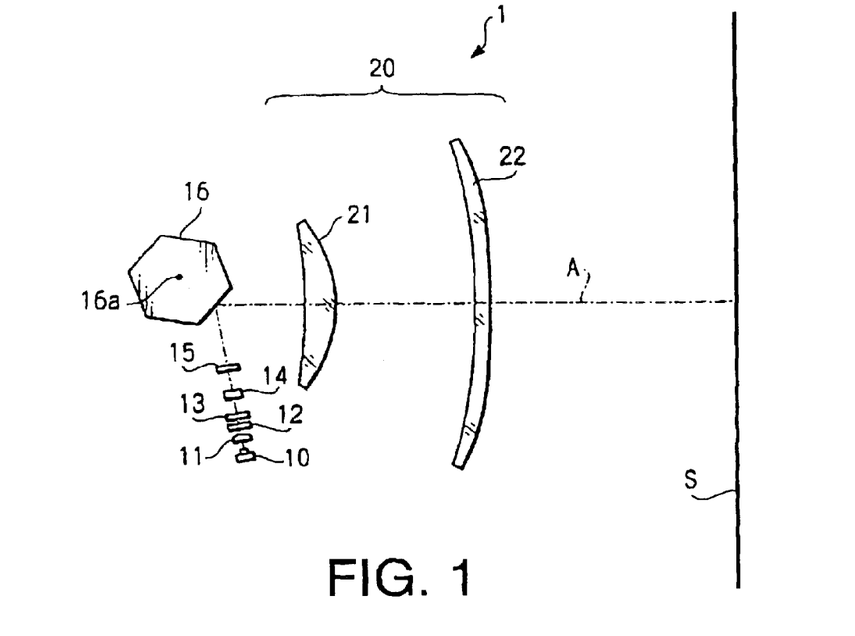
FIG. 1 shows a top view of a scanning optical system according to a first embodiment of the invention.
Figure 2:
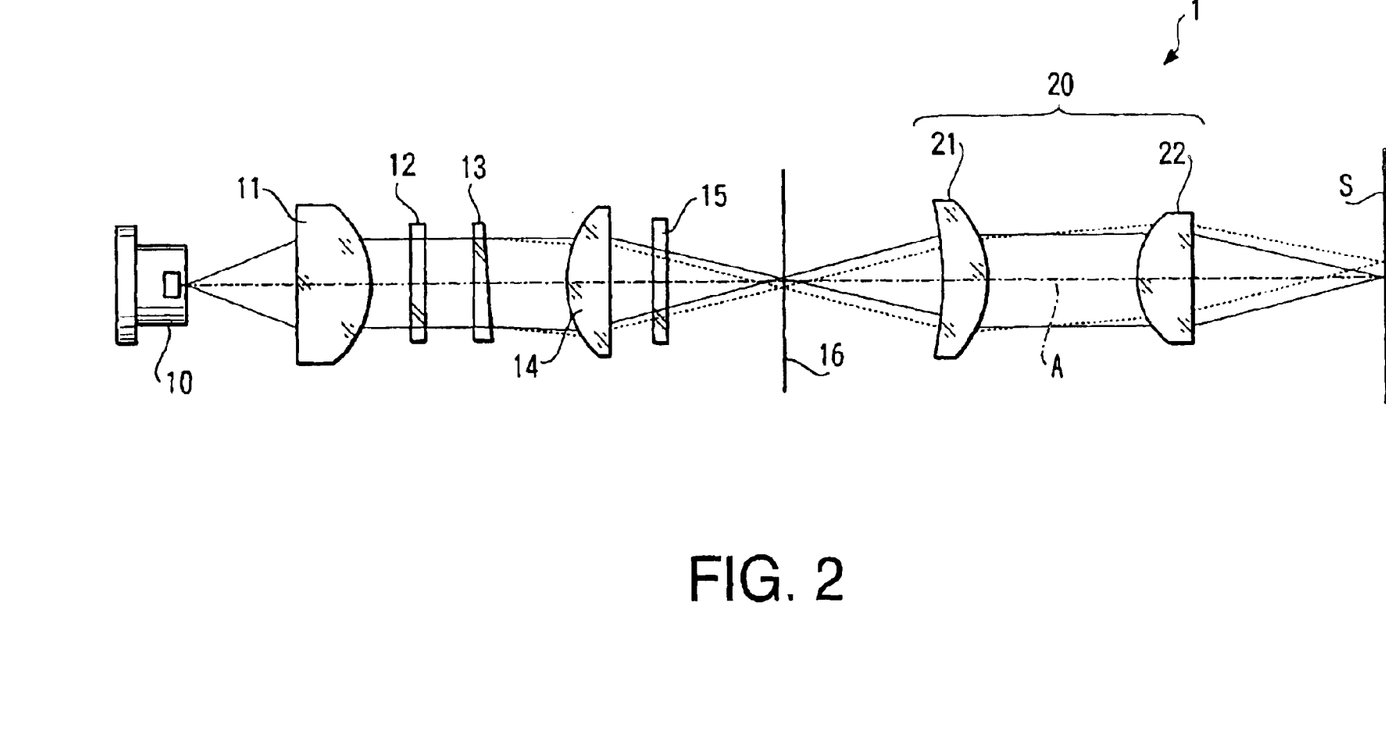
FIG. 2 schematically illustrates an optical configuration of the scanning optical system shown in FIG. 1.

FIG. 1 shows a top view of a scanning optical system 1 according to a first embodiment of the invention. FIG. 2 schematically illustrates the optical configuration of the scanning optical system 1 shown in FIG. 1, in which an optical axis A thereof is represented as a linear dashed line.

As shown in FIGS. 1 and 2, the scanning optical system 1 includes a semiconductor laser array device 10, a collimator 11, a quarter-wave plate 12, a birefringent member 13, a cylindrical lens 14, a quarter-wave plate 15, a polygon mirror 16, an image forming optical system 20, and a photosensitive drum having a scanning surface S, which are arranged in this order.

The polygon mirror 16 is provided to the scanning optical system 1 so as to be rotatable about an center axis 16a, or rotation axis, thereof. It should be noted that, hereinafter, a main scanning direction refers to a direction parallel to a plane perpendicular to the center axis 16a of the polygon mirror 16, and an auxiliary scanning direction refers to a direction parallel to the center axis 16a.

The semiconductor laser array device 10 is a single monolithic multi-laser diode designed so as to have a plurality of light emitting points arranged in the auxiliary scanning direction. Each light emitting point emits a divergent laser beam. Note that only one laser beam is depicted in FIG. 2.

The laser beams emitted from the semiconductor laser array device 10 travel toward the collimator 11. The collimator 11 is disposed such that a front focal point thereof is located on a center of a line connecting the light emitting points of the semiconductor laser array device 10. Accordingly, the divergent laser beams passed through the collimator 11 are converted into parallel light beams.

Figure 3:
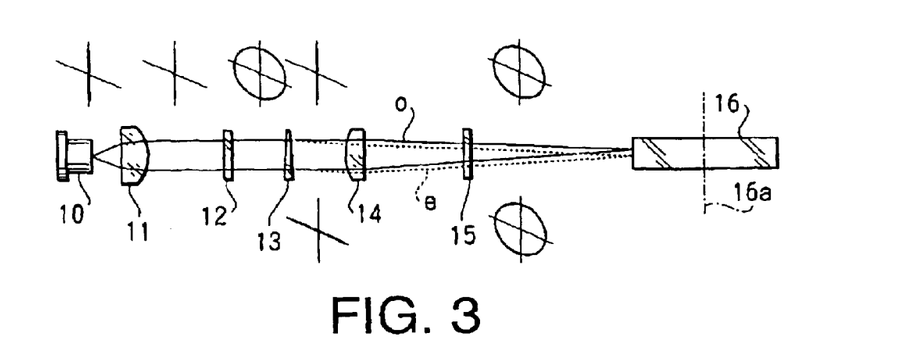
FIG. 3 schematically illustrates variation in the polarization of beams traveling between a light source and a polygon mirror of the scanning optical system shown in FIG. 1.

The laser beams emitted from the semiconductor laser array device 10 are linearly polarized beams. The quarter-wave plate 12 disposed next to the collimator 11 transforms each laser beam into circular polarized beam as shown in FIG. 3, which illustrates variation of the polarization of the laser beams traveling between the semiconductor laser array device 10 and the polygon mirror 16.

It should be noted, however, that the quarter-wave plate 12 may be replaced with a half-wave plate that adjust the polarized direction of the laser beam passing therethrough so as to make an angle of 45° with the optic axis of the birefringent member 13.

Next, each laser beam enters the birefringent member 13. The birefringent member 13 is made of an uniaxial crystal. The birefringent member 13 splits each laser beam into two rays, i.e., an ordinary ray o and an extraordinary ray e (see FIG. 3). The ordinary ray o is linearly polarized in the direction of an optic axis of the birefringent member 13 (or the uniaxial crystal), while the extraordinary ray e is linearly polarized perpendicularly to the optic axis of the birefringent member 13.

It should be noted that, since each laser beam entering the birefringent member 13 is circularly polarized, the energy levels of the ordinary ray o and extraordinary ray e generated from a given laser beam are substantially the same irrespective of the optic axis direction of birefringent member 13.

Figure 4:
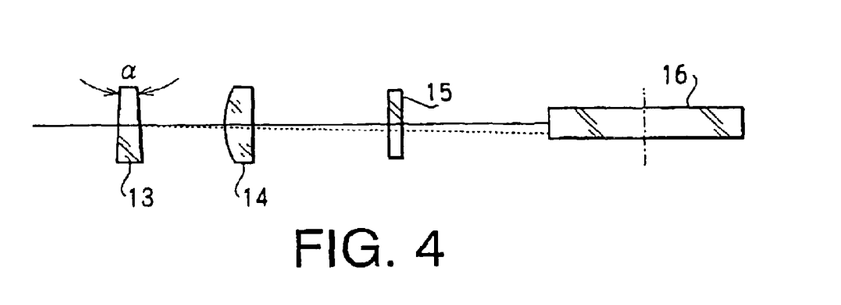
FIG. 4 illustrates the form and function of a birefringent member of the scanning optical system shown in FIG. 1.

As shown in FIG. 4, the birefringent member 13 is formed such that a cross-section thereof parallel to the auxiliary scanning direction and passing through the optical axis A has a wedge like shape of which vertex angle is α. Thus, the ordinary ray o and the extraordinary ray e passed through the birefringent member 13 are deflected in the auxiliary scanning direction, however, at slightly different angles to each other.

The laser beams emerging from the birefringent member 13 pass next through the cylindrical lens 14. Note that the number of the beams emerging from the birefringent member 13 and thus entering the cylindrical lens 14 is double of the number of laser beams emitted from the semiconductor laser array device 10. In the present, the semiconductor laser array device 10 emits four laser beams. Thus, the number of the beams entering the cylindrical lens 14 is eight.

The cylindrical lens 14 converges the laser beams passed therethrough only in the auxiliary scanning direction. Accordingly, the ordinary ray o and the extraordinary ray e generated from a single laser beam form a pair of line images on the rear focal plane (a plane including the rear focal point of the cylindrical lens 14 and extending perpendicular to the optical axis A).

The linear polarizer 15 disposed between the cylindrical lens 14 and the polygon mirror 16 transforms the beams passing therethrough into circularly polarized beams (see FIG. 3). This ensures the polygon mirror 16 to reflect the ordinary rays o and the extraordinary rays e at substantially the same reflectivity.

The polygon mirror 16 is a regular polygonal prism arranged to rotate about the center axis 16a to dynamically deflect the laser beams by the side surfaces thereof, or reflecting surfaces thereof, so that the laser beams scan on the photosensitive surface S in the main scanning direction. Note that the laser beams passed through the cylindrical lens 14 are converged in the auxiliary scanning direction near the reflecting surface of the polygon mirror 16 deflecting them toward the scanning surface S. Each laser beam dynamically deflected by the polygon mirror 16 and entering the image forming optical system 20 is a collimated light within a plane parallel to the main scanning direction, which will be referred to hereinafter as a main scanning plane, and a diverging light within a plane parallel to both the auxiliary scanning direction and an optical axis of the image forming optical system 20, which will be referred to hereinafter as an auxiliary scanning plane.

The image forming optical system 20 converges each laser beam both in the main and auxiliary scanning directions to form a beam spot on the scanning surface S. The beam spot is formed at a location displaced from the optical axis A in the main scanning direction for a distance $y=k\cdot\theta$, where $\theta$ represents the angle formed between the laser beam and the optical axis A in the main scanning direction and k a scanning constant. Accordingly, each beam spot scans across the scanning surface S in the main scanning direction at a constant speed as the polygon mirror 16 rotates at a constant angular velocity.

With respect to the auxiliary scanning direction, the image forming optical system 20 is configured such that conjugate points of the line images of the laser beams formed in the vicinity of the polygon mirror 16 (i.e., the locations at which the laser beams are converged in the auxiliary scanning direction by the cylindrical lens 14) are located on the scanning surface S. Therefore, the location in the auxiliary scanning direction at which each beam spot is formed does not vary in accordance with the tilting error, or facet error, of the side surfaces of the polygon mirror 16.

The image forming optical system 20 is composed of a scanning lens 21 and a tilting error correction lens 22 disposed between the scanning lens 21 and the scanning surface S. The scanning lens 21 has a power that converges the laser beam mainly in the main scanning direction (i.e., the scanning lens 21 takes the responsibility for forming an image in the main scanning direction). The tilting error correction lens 22 has a power that converges the laser beam mainly in the auxiliary scanning direction (i.e., the tilting error correction lens 22 takes the responsibility of forming an image in the auxiliary scanning direction). The tilting error correction lens 22 further corrects the curvature of field in the auxiliary scanning direction. The image forming optical system 20 is arranged such that the optical axis thereof coincides with the beam axis of the laser beams reflected at the center of each side surface, or reflecting surface, of the polygon mirror 16 within the main scanning plane as shown in FIG. 1. Further, the image forming optical system 20 is arranged such that the optical axis thereof intersects the center axis 16a, or rotation axis, of the polygon mirror 16 at the middle thereof within the auxiliary scanning plane.

In the present embodiment, the semiconductor laser array device 10 has four light emitting points arranged in the auxiliary scanning direction at regular intervals of 14 $\mu$m. The focal length of the collimator 11 is 16.2 mm, and the foal length of the cylindrical lens 14 with respect to the auxiliary scanning direction is 50 mm. Further, the image forming optical system 20 is designed such that the focal length with respect to the main scanning direction, the magnification in the auxiliary scanning direction, and the scanning width are 200 mm, −0.98, and 300 mm, respectively.

Further, in the present embodiment, the birefringent member 13 is made of quartz. Thus, the difference between the indices of refraction of the ordinary ray o and the extraordinary ray e is about $9\times10^{-3}$. Further, the vertex angle $\alpha$ of the birefringent member 13 is 2.6°. Thus, the difference of the directions in which the ordinary ray o and the extraordinary ray e respectively propagates after emerging from the birefringent member 13 is 0.408 mrad. As a result, the distance in the auxiliary scanning direction between the pair of line images formed in the vicinity of the polygon mirror 16 by the ordinary ray o and extraordinary ray e is 20.4 $\mu$m, and the displacement in the auxiliary scanning direction between the pair of scanning lines on the scanning surface S corresponding to this pair of line images becomes 20.0 $\mu$m.

Figure 5A:
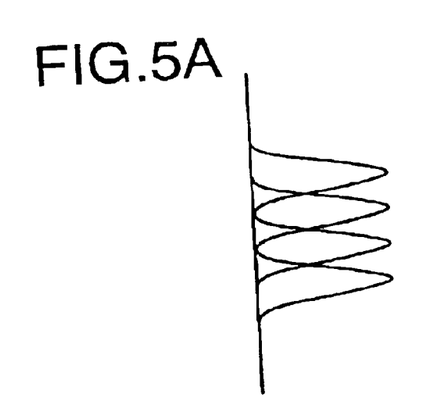
FIGS. 5A and 5B schematically illustrate a light amount distribution in an auxiliary scanning direction of the beams impinging on an object surface and beam spots formed thereon in a comparative scanning optical system not provided with a birefringent member.
Figure 5B:
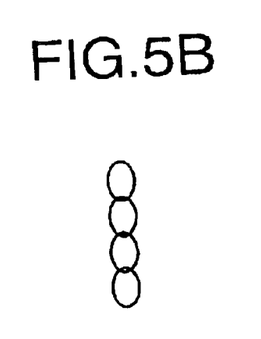

FIG. 5A schematically illustrates the light amount distribution in the auxiliary scanning direction of the beams impinging on the scanning surface S in a comparative scanning optical system that has the same arrangement as the scanning optical system 1 shown in FIG. 1 except that it is not provided with the birefringent member 13. FIG. 5B schematically illustrates the beam spots formed on the scanning surface S in the comparative scanning optical system. Note that the beam spot is defined as an area within which the light intensity at any given point is not less than a predetermined proportion of the maximum light intensity of the laser beam.

In the comparative scanning optical system that is not provided with the birefringent member 13, four beam spots are formed on the scanning surface S by the four laser beams emitted from the semiconductor laser array device 10. The four beam spots are arranged in the auxiliary scanning direction at regular intervals of 42.3 $\mu$m, and each beam spot has a width of 45 $\mu$m in the auxiliary scanning direction. Thus, as illustrated in FIG. 5B, the beam spots have almost no overlapped area, which results in low quality image to be formed by scanning these beam spots across the scanning surface S.

Figure 6A:
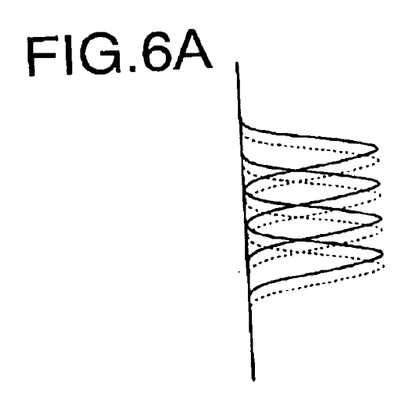
FIGS. 6A and 6B schematically illustrate a light amount distribution in the auxiliary scanning direction of the beams impinging on the scanning surface and beam spots formed thereon in the scanning optical system shown in FIG. 1.
Figure 6B:
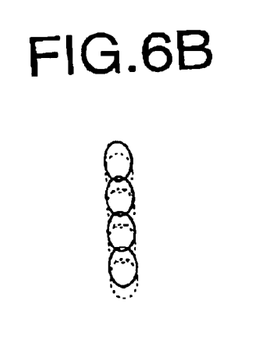

FIG. 6A schematically illustrates the light amount distribution in the auxiliary scanning direction of the beams impinging on the scanning surface S in the scanning optical system 1, and FIG. 6B schematically illustrates the beam spots formed on the scanning surface S. The solid lines in FIG. 5A illustrate the light amount distribution and beam spots associated with the four ordinary rays o. The four beam spots are arranged in the auxiliary scanning direction at regular intervals of 42.3 $\mu$m and each has a width of 45 $\mu$m in the auxiliary scanning direction. The broken lines in FIG. 6B illustrate the light amount distribution and beam spots associated with the four extraordinary rays e. As previously described, each ordinary ray o accompanies one extraordinary ray e that is displaced from the ordinary ray o in the auxiliary scanning direction for only 20 $\mu$m and thus overlaps with the ordinary ray o for a wide area.

As well known, the phases of the ordinary ray o and the corresponding extraordinary ray e differs from each other for 90°. Therefore, the ordinary ray o and the corresponding extraordinary ray e do not interfere with each other at the overlapped area. Thus, the light amount at the overlapped area becomes the sum of the light amounts of the ordinary ray o and the corresponding extraordinary ray e. As a result, each pair of the ordinary ray o and the corresponding extraordinary ray e forms a single wide beam and hence a single large beam spot on the scanning surface S.

Figure 7A:
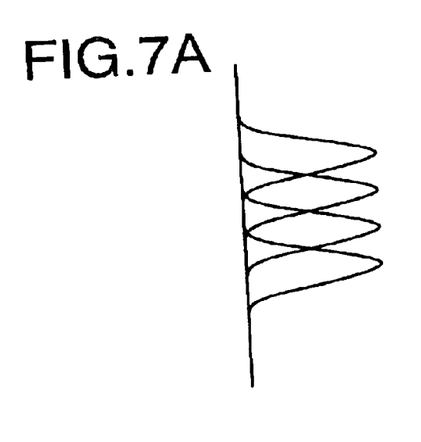
FIG. 7A schematically illustrate a light amount distribution in the auxiliary scanning direction of wide beams each formed by a pair of ordinary ray o and extraordinary ray e generated by the birefringent member.
Figure 7B:
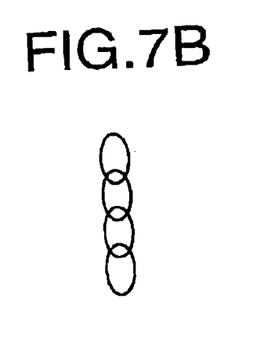
FIG. 7B illustrates beam spots formed by the wide beams on the object surface.

FIG. 7A schematically illustrates the light amount distribution in the auxiliary scanning direction of the wide beams each formed by a pair of ordinary ray o and extraordinary ray e, and FIG. 7B schematically illustrates the large beam spots formed by those wide beams. As with the beam spots shown in FIG. 5B, the four large beam spots are arranged in the auxiliary scanning direction at regular intervals of 42.3 µm. However, the width of each large beam spot is much larger than that of the normal beam spots shown in FIG. 5B and each large beam spot overlaps with the adjacent one for a width of about 20 µm in the auxiliary scanning direction. Thus, the scanning lines formed by scanning those large beam spots across the scanning surface S overlap each other in the auxiliary scanning direction and allows to form a high quality image.

Second Embodiment

Hereinafter, a scanning optical system 100 according to a second embodiment of the invention will be described with reference to FIGS. 8 through 11, in which elements that are substantially the same as those described in the first embodiment are denoted by the same reference numbers.

Figure 8:
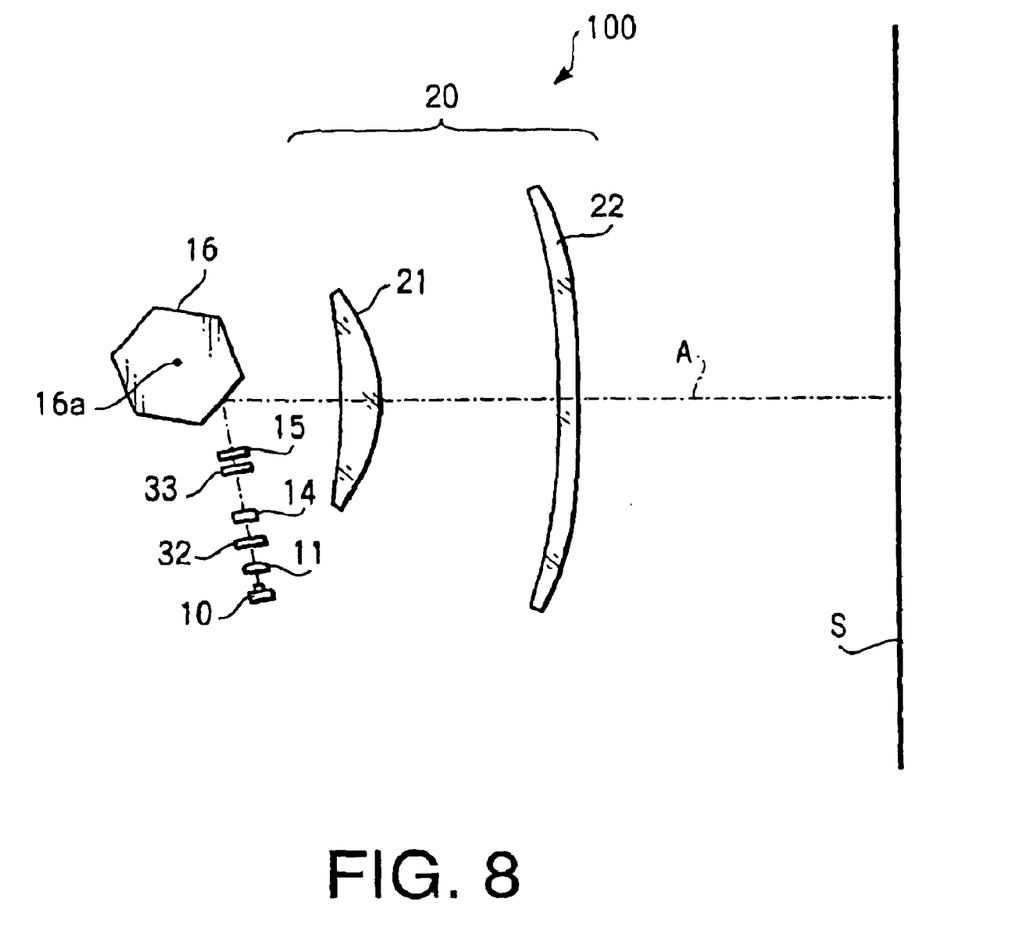
FIG. 8 shows a top view of a scanning optical system according to a second embodiment of the invention.
Figure 9:
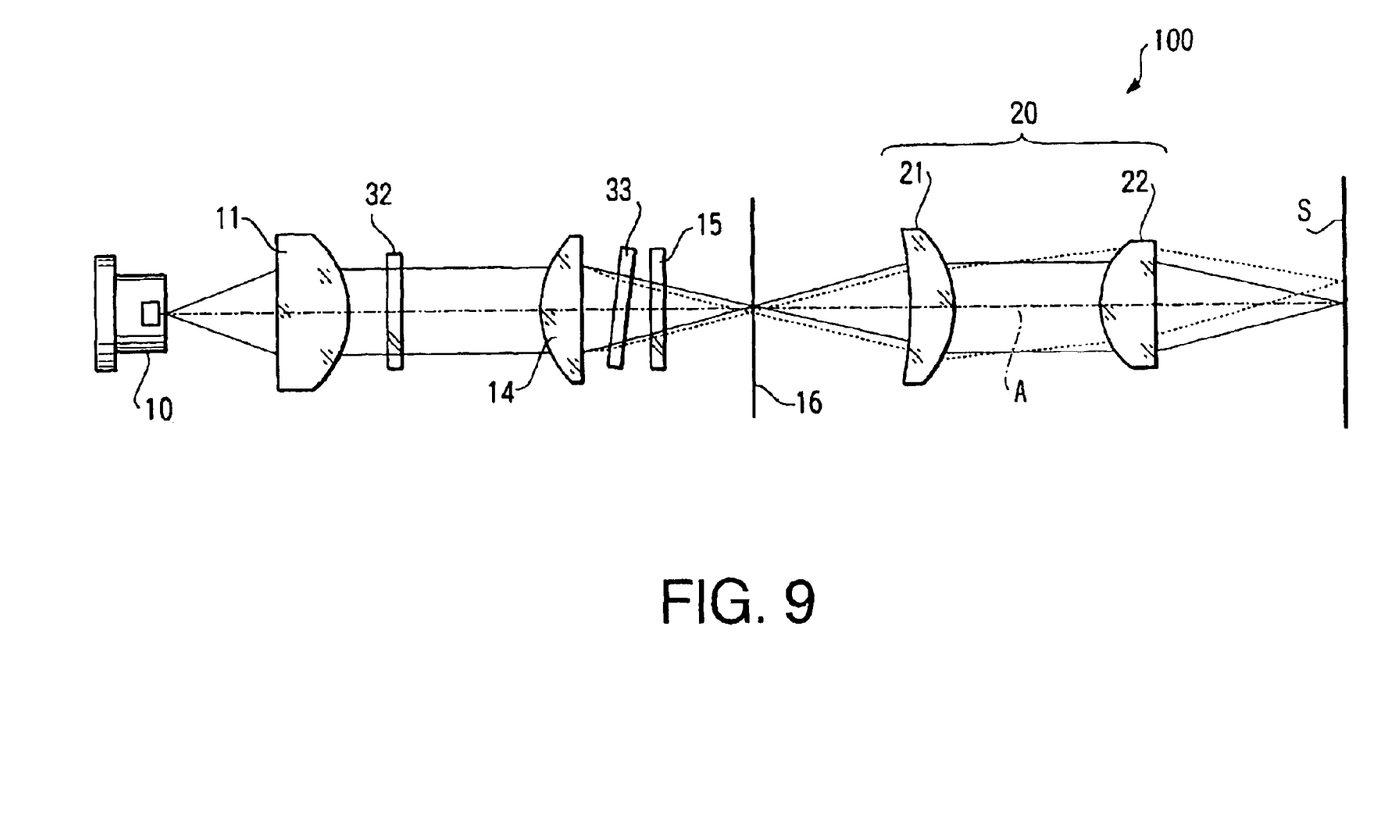
FIG. 9 schematically illustrates an optical configuration of the scanning optical system shown in FIG. 8.

FIG. 8 shows a top view of the scanning optical system 100 according to the second embodiment of the invention, and FIG. 9 schematically illustrates the optical configuration of the scanning optical system 100 shown in FIG. 8, in which the optical axis thereof is represented as a linear line.

The scanning optical system 100 according to the second embodiment has the same configuration as the scanning optical system 1 according to the first embodiment except that the quarter-wave plate 12 is replaced with a half-wave plate 32 and the birefringent member 13 is resplaced with a birefringent member 33.

Figure 10:
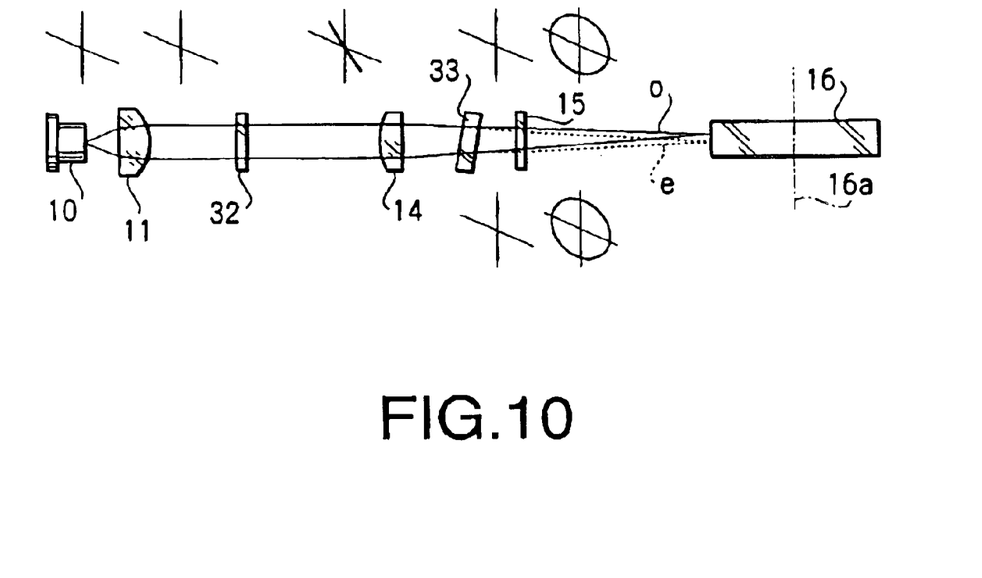
FIG. 10 illustrates variation in the polarization of beams traveling between a light source and a polygon mirror of the scanning optical system shown in FIG. 8.

The half-wave plate 32 is disposed between the collimator 11 and the cylindrical lens 14. The half-wave plate 32 adjusts the polarized direction of the linearly polarized laser beams passing therethrough so as to make an angle of 45° with the optic axis of the birefringent material 13 as shown in FIG. 10, which illustrates the polarization of the laser beams traveling between the semiconductor laser array device 10 and the polygon mirror 16.

The birefringent member 33 is a plate made of a birefringent crystal having parallel front and rear surfaces. The birefringent member 33 is disposed between the cylindrical lens 14 and the quarter-wave plate 15. As the polarized direction of each laser beam is adjusted by the half-wave plate 32 so as to make an angle of 45° with the optic axis of the birefringent member 33, the birefringent member 33 split each laser beam passed therethrough at equal rate into an ordinary ray o, which is polarized in the optic axis direction of the birefringent member 33, and an extraordinary ray e, which is polarized perpendicular to the optic axis direction (see FIG. 10).

Figure 11:
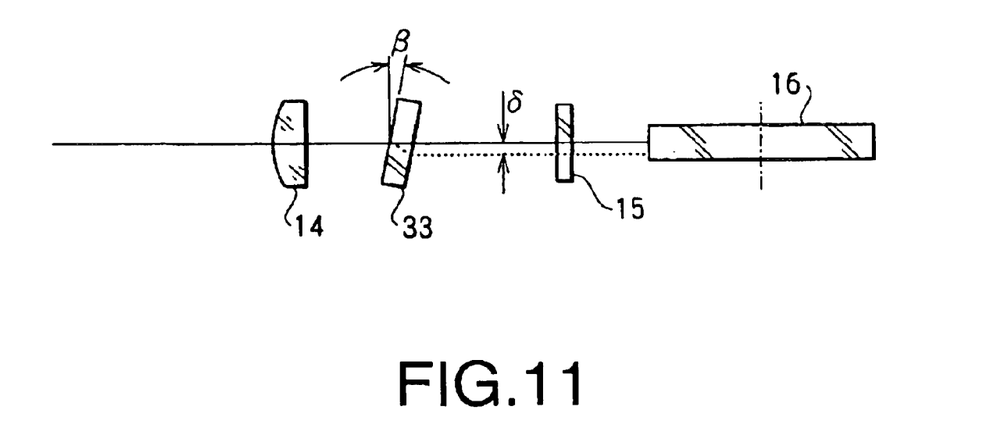
FIG. 11 illustrates the form and function of a birefringent member of the scanning optical system shown in FIG. 8.

As shown in FIG. 11, the birefringent member 33 is inclined against a plane perpendicular to the optical axis A of the scanning optical system 100 for an angle of β so that the extraordinary ray e emerging from the birefringent member 33 is displaced from the ordinary ray o in the auxiliary scanning direction for a predetermined distance δ. Note that, since the front and rear surfaces of the birefringent member 33 are parallel to each other, the ordinary ray o and extraordinary ray e emerging from the birefringent member 33 travels parallel to each other.

In the present embodiment, the birefringent member 33 is a plate having a thickness of 1.5 mm and is inclined so that the angle β becomes 3.6°. The difference between the indices of refraction of the ordinary ray o and the extraordinary ray e is about $9 \times 10^{-3}$, since the birefringent member 33 is made of quartz.

In the scanning optical system 100 configured as above, the displacement δ of the extraordinary ray e from the ordinary ray o becomes 20.4 µm, and the interval between the line images formed by the ordinary ray o and the extraordinary ray e in the vicinity of the reflection surface of the polygon mirror 16 is 20.4 µm. As a result, as with the first embodiment of the invention, each pair of the ordinary ray o and the corresponding extraordinary ray e overlap one another, form a wide beam and hence a large beam spot on the scanning surface S. Four large beam spots are formed on the scanning surface S, and these large beam spots forms wide scanning lines that overlap each other in the auxiliary scanning direction. Accordingly, the scanning optical system 100 according to the second embodiment of the invention is capable of forming a high quality image as with the scanning optical system 1 according to the first embodiment.

It should be noted, however, that the half-wave plate 32 of the scanning optical system 100 according to the second embodiment may be replaced with a quarter-wave plate.

Further, as well know in connection with the savart plate, if the optic axis of the birefringent member 33 is directed to a particular orientation, it is not necessary to incline the birefringent member 33 against the plane perpendicular to the optical axis A of the scanning optical system 100.

The present disclosure relates to the subject matter contained in Japanese Patent Application No. P2002-268438, filed on Sep. 13, 2002, which is expressly incorporated herein by reference in its entirety.

What is claimed is:

1. A scanning optical system, comprising:
   a light source that emits a plurality of beams;
   a deflector disposed on optical paths of said beams emitted from said light source, said deflector deflecting said beams toward an object surface so that beam spots formed by said beams scan on said object surface in a main scanning direction; and
   a birefringent double-image member disposed on said optical paths of said beams, said birefringent member splitting each of said beams into an ordinary ray and an extraordinary ray displaced from said ordinary ray in an auxiliary scanning direction to travel in a vicinity of said ordinary ray, said auxiliary scanning direction being perpendicular to the main scanning direction.

2. The scanning optical system according to claim 1, wherein said birefringent double-image member is configured such that each extraordinary ray travels in a direction slightly inclined against a direction in which the corresponding ordinary ray travels.

3. The scanning optical system according to claim 2, further comprising:
   a collimator disposed between said light source and said deflector, said collimator converting said beams emitted from said light source from divergent lights into collimated lights;
   a line image forming lens disposed between said collimator and said deflector, said beams being converged by said line image forming lens in the auxiliary scanning direction to form a line image in a vicinity of said deflector; and
   an image forming optical system disposed between said deflector and the object surface, said beams deflected by said deflector being converged by said image forming optical system in a vicinity of the object surface in both the main and auxiliary scanning direction,
   wherein said birefringent double-image member is disposed between said collimator and said line image forming lens.

4. The scanning optical system according to claim 2, wherein said birefringent double-image member has a wedge like form.

5. The scanning optical system according to claim 1, wherein said birefringent double-image member is configured such that each extraordinary ray travels in parallel with the corresponding ordinary ray.

6. The scanning optical system according to claim 5, further comprising:

a collimator disposed between said light source and said deflector, said collimator converting said beams emitted from said light source from divergent lights into collimated lights;

a line image forming lens disposed between said collimator and said deflector, said beams being converged by said line image forming lens in the auxiliary scanning direction to form a line image in a vicinity of said deflector; and an image forming optical system disposed between said deflector and the object surface, said beams deflected by said deflector being converged by said image forming optical system in a vicinity of the object surface in both the main and auxiliary scanning direction, wherein said birefringent double-image member is disposed between said line image forming lens and said deflector.

7. The scanning optical system according to claim 5, wherein said birefringent double-image member is a plate having parallel surfaces.

8. The scanning optical system according to claim 1, wherein said beams emitted from said light source are linearly polarized, and wherein a quarter-wave plate is disposed between said light source and said birefringent double-image member.

9. The scanning optical system according to claim 8, wherein said light source is a semiconductor laser.

10. The scanning optical system according to claim 8, further comprising a second quarter-wave plate disposed between said birefringent double-image member and said deflector.

11. The scanning optical system according to claim 1, wherein said beams emitted from said light source are linearly polarized, and wherein a half-wave plate is disposed between said light source and said birefringent double-image member, said half-wave plate adjusting a polarized direction of each of said linearly polarized beams so as to make an angle of 45° with an optic axis of said birefringent double-image member.

12. The scanning optical system according to claim 11, wherein said light source is a semiconductor laser.

13. The scanning optical system according to claim 11, further comprising a quarter-wave plate disposed between said birefringent double-image member and said deflector.

* * * * *